(12) United States Patent
Sato et al.

(10) Patent No.: US 11,326,220 B2
(45) Date of Patent: May 10, 2022

(54) METHOD FOR PRODUCING MACHINE COMPONENT

(71) Applicant: KOMATSU LTD., Tokyo (JP)

(72) Inventors: Kensuke Sato, Tokyo (JP); Koji Yamamoto, Tokyo (JP); Yusuke Hiratsuka, Himeji (JP); Kazuya Hashimoto, Himeji (JP)

(73) Assignee: KOMATSU LTD., Tokyo (JP)

( * ) Notice: Subject to any disclaimer, the term of this patent is extended or adjusted under 35 U.S.C. 154(b) by 52 days.

(21) Appl. No.: 17/046,087

(22) PCT Filed: May 10, 2019

(86) PCT No.: PCT/JP2019/018694
§ 371 (c)(1),
(2) Date: Oct. 8, 2020

(87) PCT Pub. No.: WO2019/244504
PCT Pub. Date: Dec. 26, 2019

(65) Prior Publication Data
US 2021/0032716 A1  Feb. 4, 2021

(30) Foreign Application Priority Data

Jun. 18, 2018 (JP) .............................. JP2018-115350

(51) Int. Cl.
| | | |
|---|---|---|
| C21D 9/32 | (2006.01) | |
| C21D 1/06 | (2006.01) | |
| C21D 1/32 | (2006.01) | |
| C21D 6/00 | (2006.01) | |
| C22C 38/00 | (2006.01) | |
| C22C 38/02 | (2006.01) | |
| C22C 38/04 | (2006.01) | |
| C22C 38/06 | (2006.01) | |
| C22C 38/24 | (2006.01) | |
| C22C 38/26 | (2006.01) | |
| C22C 38/28 | (2006.01) | |
| C22C 38/32 | (2006.01) | |
| C22C 38/44 | (2006.01) | |
| C23C 8/22 | (2006.01) | |
| C23C 8/80 | (2006.01) | |

(52) U.S. Cl.
CPC ................. *C21D 9/32* (2013.01); *C21D 1/06* (2013.01); *C21D 1/32* (2013.01); *C21D 6/002* (2013.01); *C22C 38/001* (2013.01); *C22C 38/002* (2013.01); *C22C 38/02* (2013.01); *C22C 38/04* (2013.01); *C22C 38/06* (2013.01); *C22C 38/24* (2013.01); *C22C 38/26* (2013.01); *C22C 38/28* (2013.01); *C22C 38/32* (2013.01); *C22C 38/44* (2013.01); *C23C 8/22* (2013.01); *C23C 8/80* (2013.01); *C21D 2211/001* (2013.01); *C21D 2211/002* (2013.01); *C21D 2211/009* (2013.01)

(58) Field of Classification Search
CPC .... C23C 8/22; C23C 8/32; C21D 1/32; C21D 6/002
See application file for complete search history.

(56) References Cited

U.S. PATENT DOCUMENTS

| | | | |
|---|---|---|---|
| 2004/0094238 A1 | 5/2004 | Kinami et al. | |
| 2006/0130935 A1 | 6/2006 | Hattori et al. | |
| 2010/0084051 A1* | 4/2010 | Mizuno ................... | C21D 9/32 148/223 |
| 2012/0318408 A1 | 12/2012 | Kozawa et al. | |
| 2020/0165710 A1 | 5/2020 | Minamino et al. | |

FOREIGN PATENT DOCUMENTS

| | | |
|---|---|---|
| CN | 105239017 A | 1/2016 |
| EP | 2530178 A1 | 12/2012 |
| JP | S62-24499 B2 | 5/1987 |
| JP | H02-156063 A | 6/1990 |
| JP | H0559527 A | 3/1993 |
| JP | H06-108226 A | 4/1994 |
| JP | 2002-348615 A | 12/2002 |
| JP | 2005-154784 A | 6/2005 |
| JP | 2006-161141 A | 6/2006 |
| JP | 2010-090437 A | 4/2010 |
| JP | 2016-050350 A | 4/2016 |
| JP | 2016-156037 A | 9/2016 |
| JP | 2017-057479 A | 3/2017 |
| WO | 2011/132722 A1 | 10/2011 |

* cited by examiner

*Primary Examiner* — Jessee R Roe
(74) *Attorney, Agent, or Firm* — Oliff PLC

(57) ABSTRACT

A method for producing a machine component excellent in pitting resistance characteristics and toughness includes a carburizing step, performed on a steel material containing 0.13-0.30% C and 0.90-2.00% Cr in mass % and at least one of Si, Mn, Ni, Mo, Nb, V, Ti, B, Al, and N, balance Fe and unavoidable impurities; heating the material to 850-1030° C. to attain carbon concentration in a surface of 0.8-1.5%; cooling the material at an average rate of 5° C./sec or lower from a temperature higher than the $A_{cm}$ point of a surface layer to a cooling end temperature that is at least 50° C. lower than the $A_1$ point to cause the surface layer to have a pearlite or bainite structure with dispersion; spheroidizing annealing at a temperature not higher than the $A_{cm}$ point at the surface layer; heating the material to not higher than the $A_{cm}$ point at the surface layer; and performing tempering.

4 Claims, 4 Drawing Sheets

METHOD FOR PRODUCING MACHINE COMPONENT

TECHNICAL FIELD

The present invention relates to a method for producing a machine component excellent in pitting resistance characteristics and toughness, which is used for a component that is made up of a steel for machine structural use and supposed to undergo a high surface pressure.

This application claims priority based on Japanese Patent Application No. 2018-115350 filed on Jun. 18, 2018, and the entire contents of this Japanese Patent Application are incorporated herein by reference.

BACKGROUND ART

Machine components, for example, components such as gears and shafts receiving high surface pressure, are obtained by forming a steel material into a shape of the component by hot forging, cold forging, cutting and the like, and subjecting the resultant material to carburizing processing such as gas carburizing or vacuum carburizing before being used. The material may additionally be subjected to grinding, shot peening, etc. as required. Carburizing processing is processing of causing carbon to enter into a steel component from the surface, after achieving a high solid solubility limit of carbon to the steel by heating the steel to a high temperature not lower than the austenitizing temperature.

Generally, carburization allows 0.7-0.8% carbon to enter the surface of the steel component. Thereafter, the steel component is quenched. The quenching may be performed directly from the carburizing temperature, or it may be performed after cooling the steel component from the carburizing temperature to a typical quenching temperature. Alternatively, the steel component may be once cooled after the carburizing processing, and then re-heated before being quenched. The steel component is then tempered.

On the other hand, when a steel is merely subjected to similar heat history as the steel component in the carburized state, some of the carbon in the steel that cannot be dissolved in a solid state in the steel, restricted by the solid solubility limit of carbon into austenite, will remain in the steel as carbides. When such carbides remaining in the steel precipitate at the grain boundaries, they will adversely affect the toughness.

With recent reduction in size and weight of drive-train units as typified by transmissions in automobiles for the purpose of improving fuel efficiency, gears, shafts and the like tend to be subjected to increasingly higher loads. Particularly, the gears may suffer shortened life due to the pitting occurring on the tooth surface or tooth breakage.

To address these problems, as a technique of increasing the pitting resistance of the tooth surfaces of the gears, a high-concentration carburizing method has been proposed, wherein carbides that would not likely be decomposed even in quasi-high to high temperatures, for example $Fe_3C$, or, cementite, M23C6-type carbides, etc., are allowed to precipitate aggressively to increase the hardness, and to improve the resistance to temper softening (see, for example, Patent Literature 1).

Another high-concentration carburizing method has also been proposed, wherein the carbon concentration in the surface of a steel component is adjusted to high concentration of 1.2% or more to allow fine carbides to precipitate in a large amount, and further to improve the resistance to temper softening (see, for example, Patent Literature 2).

It has been pointed out that these high-concentration carburizing methods adversely affect the toughness, due to coarse carbides precipitating at the grain boundaries (see, for example, Patent Literatures 3 and 4).

Patent Literature 3 proposes a producing method which includes, following high-concentration carburization, performing slow cooling by air cooling at a cooling rate that causes pearlite transformation, to transform a surface layer structure into pearlite, and thereafter, performing induction hardening under such heating and cooling conditions that cause cementite in the pearlite structure to be finely divided, so that fine carbides with a size of 1 µm or less account for 90% or more of the carbides.

In Patent Literature 3, lamellar cementite, extending in a thin, elongated form in the pearlite structure, is divided during the short time of induction hardening, so the proportion of spheroidized cementite with an aspect ratio of 1.5 or less is low. This was still not sufficient enough from the standpoint of toughness. In the case of Patent Literature 4 as well, the obtained steel was still not sufficient enough in terms of toughness.

On the other hand, Patent Literature 5 proposes a steel with high hardness and excellent toughness, containing a large amount of carbon, with its C content being 0.55-1.10% in mass %, the structure of the steel after quenching being a dual phase structure of martensitic structure and spheroidized carbide, with the proportion of spheroidized cementite to the entire cementite and the proportion of cementite on the prior austenite grain boundaries being controlled. The carbon concentration of this steel is similar to the surface carbon concentration of a steel component that has undergone carburizing processing. However, with this steel, the carbon concentration is kept high to the inside of a steel component, hindering achievement of sufficient toughness as compared to the steel component that has undergone carburizing processing and has a low carbon concentration in the inside. It is required to further increase the toughness, while keeping a good balance with the hardness.

CITATION LIST

Patent Literature

Patent Literature 1: Japanese Patent Application Laid-Open No. 2002-348615
Patent Literature 2: Japanese Patent Application Laid-Open No. 2006-161141
Patent Literature 3: Japanese Patent Application Laid-Open No. 2010-90437
Patent Literature 4: Japanese Patent Application Laid-Open No. 2016-50350
Patent Literature 5: Japanese Patent Application Laid-Open No. 2017-57479

SUMMARY OF INVENTION

Technical Problem

An object of the present invention is to provide a method for producing a machine component excellent in pitting resistance characteristics and toughness, for use as a component that will undergo a high surface pressure.

Solution to Problem

A first solution of the present invention for accomplishing the above object is a method for producing a machine component, which includes the steps of: preparing a material formed of a steel material containing 0.13-0.30% C and 0.90-2.00% Cr in mass % and further containing at least one of Si, Mn, Ni, Mo, Nb, V, Ti, B, Al, and N, with the balance consisting of Fe and unavoidable impurities;

carburizing the material at a heating temperature of 850-1050° C. to attain a carbon concentration of 0.8-1.5% in a surface layer of the material;

cooling the material at an average rate of 5° C./sec or lower in a temperature range from a temperature higher than the $A_{cm}$ point (° C.) at the surface layer of the material to a cooling end temperature that is at least 50° C. lower than the $A_1$ point (° C.), to cause the surface layer to have a pearlite structure or a bainite structure;

performing spheroidizing annealing at a heating temperature not higher than the $A_{cm}$ point (° C.) at the surface layer, to spheroidize carbides in the pearlite structure or the bainite structure; and after heating the material to a temperature not higher than the $A_{cm}$ point (° C.) at the surface layer of the material, performing quenching and then tempering.

A second solution of the present invention is a method for producing a machine component using a steel material having a component composition containing 0.13-0.30% C and 0.90-2.00% Cr in mass % and further containing at least one of Si, Mn, Ni, Mo, Nb, V, Ti, B, Al, and N, with the balance consisting of Fe and unavoidable impurities, the machine component being carburized to attain a carbon concentration in a surface of 0.8-1.5%, a surface layer that includes an outermost surface having a structure made up of a martensitic structure with spheroidized carbides dispersed therein and a residual austenitic structure, the spheroidized carbides with an aspect ratio of 1.5 or less constituting 90% or more of all carbides, as to the carbides on prior austenite grain boundaries, the proportion of the number of the spheroidized carbides on the prior austenite grain boundaries to a total number of the carbides being 40% or less, wherein the method includes the steps of:

preparing a material formed of the steel material having the component composition;

carburizing the material at a heating temperature of 850-1030° C. to attain the carbon concentration of 0.8-1.5% in the surface layer;

cooling the material at an average rate of 5° C./sec or lower in a temperature range from a temperature higher than the $A_{cm}$ point (° C.) at the surface layer to a cooling end temperature that is at least 50° C. lower than the $A_1$ point (° C.), to cause the surface layer to have a pearlite structure or a bainite structure;

performing spheroidizing annealing at a heating temperature not higher than the $A_{cm}$ point (° C.) at the surface layer, to spheroidize carbides in the pearlite structure or the bainite structure; and after heating the material to a temperature not higher than the $A_{cm}$ point (° C.) at the surface layer of the material, performing quenching to form the martensitic structure, and then performing tempering.

A third solution of the present invention is the machine component producing method according to the second solution, wherein further, in the machine component, 90% or more of the spheroidized carbides on the prior austenite grain boundaries have a particle size of 1 µm or less.

A fourth solution of the present invention is the machine component producing method according to the third solution, wherein further, in the machine component, the prior austenite grain boundaries provide an average grain size of 15 µm or less.

Effects of the Invention

The producing method according to the solutions of the present invention is able to produce a machine component excellent in pitting resistance characteristics and toughness, used for a machine component supposed to undergo a high surface pressure, by using the steel material according to the above solutions.

DESCRIPTION OF EMBODIMENT

Figure 1:
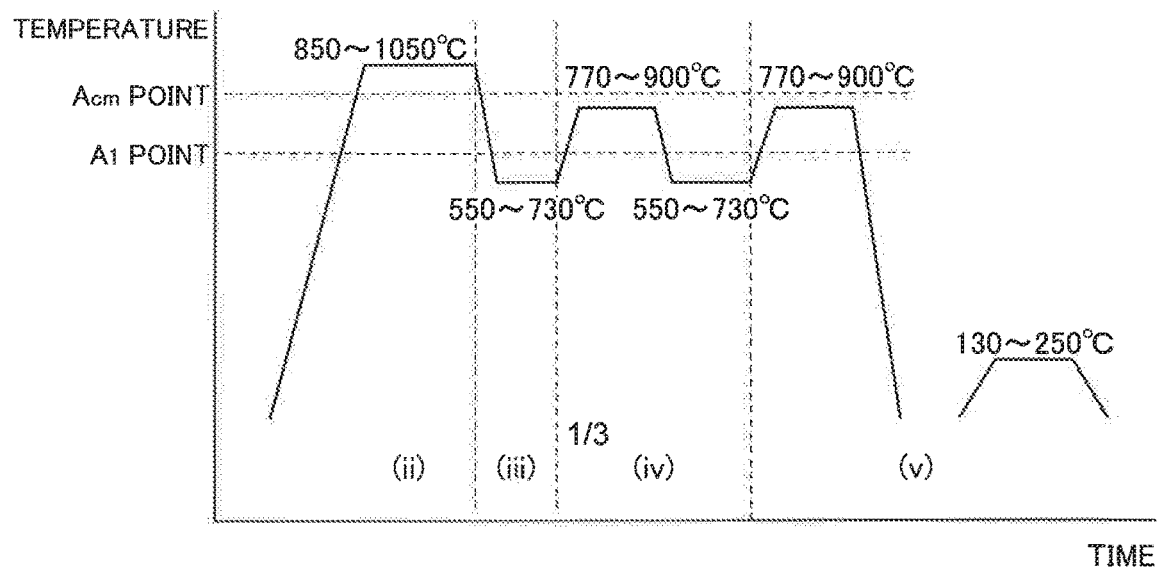
FIG. 1 is a schematic diagram showing steps of a producing method in an embodiment.

Prior to describing an embodiment for carrying out the invention, a description will be made about the reasons for limiting the component composition of the steel material as a steel for machine structural use before carburizing processing in the present invention and the reasons for limiting the steps in the present invention.

C: 0.13-0.30%

C is an element that affects hardenability, forgeability, and mechanical workability of the core of a steel component. If the content of C is less than 0.13%, sufficient hardness of the core cannot be obtained, leading to lowered strength, so C is required to be added in an amount of 0.13% or more, and is desirably added in an amount of 0.16% or more. On the other hand, C is an element that, when contained in a large amount, increases the hardness of the material and impairs workability such as machinability and forgeability. If the C content is excessive, the core of the material will become excessively hard, leading to degraded toughness. The C content is thus required to be 0.30% or less, and is desirably 0.28% or less. Accordingly, the C content is set to be 0.13-0.30%, and desirably 0.16-0.28%.

Cr: 0.90-2.00%

Cr is an element that improves hardenability, and also facilitates spheroidization of carbides by spheroidizing annealing. To obtain these effects, the Cr content is required to be 0.90% or more, and is desirably 1.00% or more. On the other hand, Cr is an element that, when added excessively, embrittles cementite and degrades toughness. Further, Cr is an element that, when contained in a large amount, blocks carburization, leading to reduced hardness of the material, and also forms coarse carbides during carburization, leading to lowered pitting resistance. The Cr content is thus required to be 2.00% or less, and is desirably 1.90% or less. Accordingly, the Cr content is set to be 0.90-2.00%, and desirably greater than 1.50% and not greater than 1.90%.

In order to obtain a machine component with excellent pitting resistance characteristics and excellent toughness with the producing method of the present invention, control of the shape and distribution of carbides is important. Carbides are mainly cementite ($Fe_3C$), and may further include $M_{23}C_6$-type carbides (mainly, $Cr_{23}C_6$) and (Fe Cr)$_3$C. The primary constituent elements of carbides are Fe, Cr, and C, so C and Cr greatly affect the shape and distribution of the carbides. Thus, in the present invention, C and Cr components added to the steel are defined as described above.

On the other hand, the other additive elements have less influence on the shape and distribution of carbides, important in the present invention, as compared to C and Cr. Thus, the following selective components may be added in typical amounts for a case hardening steel for machine structural use.

(Selective Components)

One or more from among Si, Mn, Ni, Mo, Nb, V, Ti, B, Al, and N

Si, Mn, Ni, Mo, Nb, V, Ti, B, Al, and N are elements among which one or more elements are selected and used in accordance with the required usage.

When any of these components is added as the selective component, the content is desirably within the following range, for example.

The content of Si, when contained, is desirably 0.15-0.80%.

Si is an element that increases resistance to temper softening of the steel component, and also is effective in improving pitting characteristics. Further, the intergranular oxidation depth will decrease with Si added in an amount of 0.15% or more, so the Si content is required to be 0.15% or more for improvement of the pitting characteristics. On the other hand, Si is an element that, when contained in a large amount, blocks carburization, thereby degrading pitting resistance strength. Thus, the Si content is required to be 0.80% or less.

The content of Mn, when contained, is preferably 0.90% or less.

Mn is an element that, when contained in a large amount, decreases toughness. Thus, the Mn content is required to be 0.90% or less.

The content of P is desirably 0.030% or less.

P is an impurity element unavoidably contained in the steel. P is an element that segregates in the grain boundary and degrades toughness. Thus, the P content is required to be 0.030% or less.

The content of S is desirably 0.030% or less.

S is an impurity element unavoidably contained in the steel. S is an element that is bonded to Mn to form MnS, thereby degrading toughness. Thus, the S content is required to be 0.030% or less. The total amount of unavoidable impurities including P, S, etc. is desirably limited to be less than 1.0%.

The content of Al, when contained, is desirably 0.020% or more.

Al is an element that is effective in suppressing coarsening of grains, as it is bonded to N to generate AlN. Coarsened grains lead to degraded toughness. Thus, the Al content is required to be 0.020% or more.

The content of N, when contained, is desirably 0.008% or more.

N is an element that finely precipitates in the steel as Al nitride, Nb nitride, or other nitrides, and is effective in suppressing coarsening of grains which would decrease the strength such as toughness of the steel component. To obtain such effects, the N content is required to be 0.008% or more.

Ni, Mo, V, and B are elements effective in improving toughness.

When B is contained, Ti is desirably contained in an amount of 0.01-0.05%.

Ti is an element that, when B is added, allows B to exert an effect of improving hardenability. For the improvement of hardenability, nitrogen and Ti are required to be bonded to form Ti nitride. Thus, Ti is added in an amount of 0.01% or more. It should be noted that the added amount of Ti is desirably 3.4 times or more of the added amount of N.

The content of Nb, when contained, is desirably 0.01-0.10%.

Nb is an element that forms carbides or carbonitrides during carburization, and is effective in refining grains. Further, with the grains refined by Nb, the intergranular oxidization depth becomes shallow, and even if cracking causing intergranular oxidization occurs, the length of the cracking becomes short. However, if the Nb content is less than 0.01%, the effect of decreasing the cracking length cannot be obtained. On the other hand, if the Nb content exceeds 0.10%, the effect of refining the grains will be saturated.

A steel material used as the material in the producing method of the present invention contains 0.13-0.30% C and 0.90-2.00% Cr in mass %, and further contains at least one of Si, Mn, Ni, Mo, Nb, V, Ti, B, Al, and N, with the balance consisting of Fe and unavoidable impurities.

In the present invention, a machine component can be produced by a procedure including the following steps. FIG. 1 schematically illustrates an exemplary procedure as a line graph that indicates the relationship between time and treatment temperature. The procedure includes:

(i) a step of preparing a material of a shape of a machine component with a steel material;

(ii) a step of carburizing the material at a heating temperature of 850-1050° C., to attain a carbon concentration of 0.8-1.5% in mass % in a surface layer of the material;

(iii) a step of cooling the material at an average rate of 5° C./sec or lower in a temperature range from a temperature higher than the $A_{cm}$ point (° C.) at the surface layer of the material to a cooling end temperature that is at least 50° C. lower than the $A_1$ point (° C.), to cause the surface layer to have a pearlite structure or a bainite structure;

(iv) a step of performing spheroidizing annealing at a heating temperature not higher than the $A_{cm}$ point (° C.) at the surface layer of the material; and (v) a step of, after heating the material to a temperature not higher than the $A_{cm}$ point (° C.) at the surface layer of the material, performing quenching and then tempering.

The reasons for these steps will now be described individually.

Figure 2:
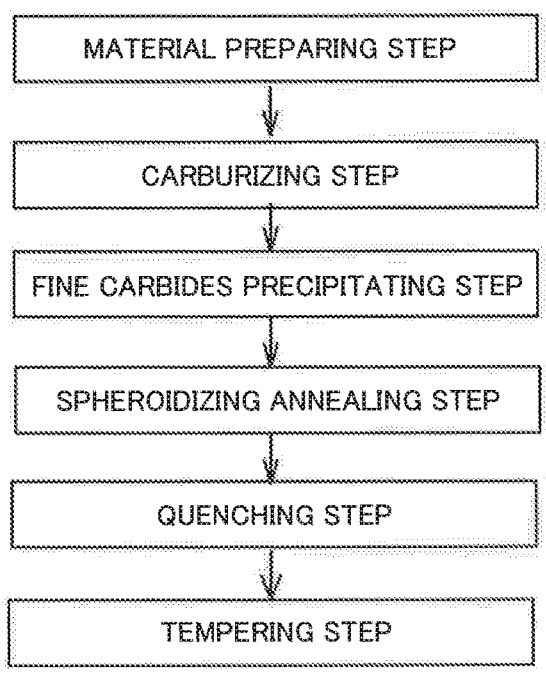
FIG. 2 is a flowchart illustrating a step procedure of the producing method in the embodiment.

FIG. 2 is a flowchart illustrating the process steps.

Figure 3:
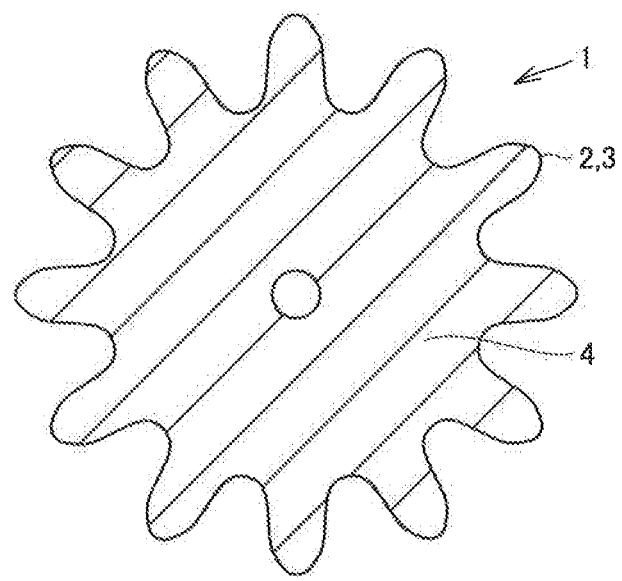
FIG. 3 is a cross-sectional view showing an exemplary machine component produced by the present invention.
Figure 4:
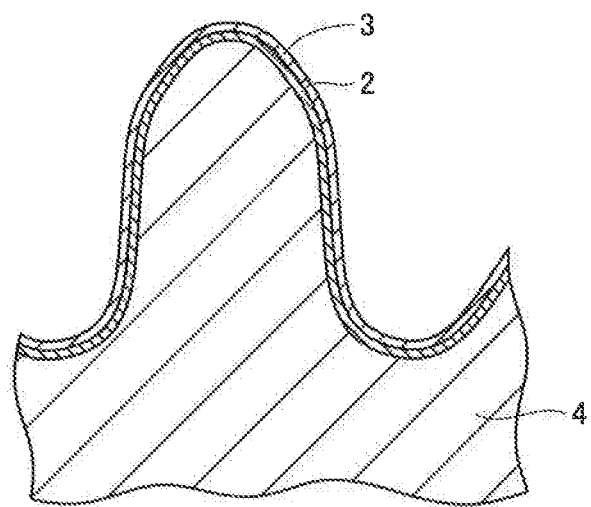
FIG. 4 is a cross-sectional view showing, in enlarged view, a cross section of a portion of the machine component produced by the present invention.

(i) Step of Preparing a Material of a Shape of the Machine Component with a Steel Material A steel material is roughly formed by forging or the like, and subjected to machining to form a material of the same shape as an intended machine component. FIGS. 3 and 4 are cross-sectional views of a gear as an example of a machine component 1. The machine component 1 is obtained by subjecting the material to the following steps.

(ii) Step of Carburizing the Material at a Heating Temperature of 850-1050° C., to Attain a Carbon Concentration of 0.8-1.5% in a Surface Layer of the Material The material that has undergone the step (ii) includes a core 4 and a carburized layer 2 covering the surface of the core 4. The carburized layer 2 has a surface layer 3 on the surface side of the material. The surface layer 3 has a depth of at least 0.3 mm from the outermost surface. To obtain the effects of the steps according to the present invention, the heating temperature is required to be higher than the $A_{cm}$ point (° C.). The material can be carburized to a predetermined carbon concentration in a shorter period of time with a higher heating temperature of the material. Too high a heating temperature of the material leads to a shortened life of a heating furnace. Thus, the heating temperature of the material is set to be 850-1050° C.

If the carbon concentration in the surface layer 3 of the material is less than 0.8%, intended carbides may not precipitate sufficiently. On the other hand, if the carbon concentration in the surface layer 3 of the material exceeds 1.5%, carbides having an aspect ratio exceeding 1.5 will be formed on the austenite grain boundaries, leading to degraded toughness. Thus, the material is carburized to attain the carbon concentration of 0.8-1.5% in the surface layer 3.

The carbon concentration is preferably lower from the standpoint of toughness, and preferably higher from the standpoint of hardness. Therefore, for achieving an appropriate balance between them, the carbon concentration in the surface layer 3 is further preferably 0.85-1.20%.

The carbon concentration in the surface layer 3 refers to an average carbon concentration in the region from the surface of the material to the depth of 0.3 mm. The carburization may be carried out by gas carburizing, vacuum carburizing, or carbonitriding.

It should be noted that cooling may be performed directly in the following step, or alternatively, the material may be once cooled as appropriate and then reheated to a predetermined heating temperature before being cooled in the following step.

(iii) Step of Cooling the Material at an Average Rate of 5° C./Sec or Lower in a Temperature Range from a Temperature Higher than the $A_{cm}$ Point (° C.) at the Surface Layer 3 to a Cooling End Temperature that is at Least 50° C. Lower than the $A_1$ Point (° C.)

To obtain the effects of the steps according to the present invention, the carbides are required to be distributed in an appropriate size and with an appropriate area ratio. To this end, after the carburization, the component material needs to be once cooled, without quenching, and then subjected to predetermined heat treatment.

The reason for the above step is to cause some of C supersaturatedly dissolved in the component material during carburization to precipitate as carbides. The surface layer after the cooling has a pearlite structure or a bainite structure.

Thus, the cooling rate during the above temperature range is set to be 5° C./sec or lower in average. If the material is cooled at a cooling rate higher than 5° C./sec in average, martensite will be generated, and the material will be cooled with the carbides still being supersaturatedly dissolved. In this case, carbides having a sufficient size will hardly precipitate in the following step; only fine carbides will precipitate. With insufficient growth of the carbides, desired toughness and pitting resistance cannot be obtained.

The present step may be performed after the material is once cooled to a room temperature. Alternatively, it may be performed after the temperature has become lower than the $A_1$ point at the surface layer 3, as shown in FIG. 1.

(iv) Step of Performing Spheroidizing Annealing at a Heating Temperature not Higher than the $A_{cm}$ Point (° C.) at the Surface Layer 3 of the Material To obtain the effects of the steps according to the present invention, it is required that the carbides are grown to an appropriate size and distributed at an appropriate area ratio. To this end, it is necessary to perform spheroidizing annealing at a heating temperature not higher than the $A_{cm}$ point (° C.). It should be noted that the $A_{cm}$ point refers to a temperature at which, during heating, carbides in the hypereutectoid steel dissolve completely.

The reason for the above step is that if spheroidizing annealing is performed at a heating temperature not lower than the $A_{cm}$ point (° C.) on the surface layer 3, the carbides will be fully dissolved in a solid state in the material, in which case the effects of the steps according to the present invention cannot be obtained.

It should be noted that the present step may be performed after the material is once cooled to a room temperature, or after the temperature has become lower than the $A_{r1}$ point.

(v) Step of, after Heating the Material to a Temperature not Higher than the $A_{cm}$ Point (° C.) at the Surface Layer 3 of the Material, Performing Quenching and then Tempering To obtain the effects of the steps according to the present invention, it is required that the carbides are grown to an appropriate size and distributed at an appropriate area ratio. Further, the material is required to obtain hardness usable as a machine component 1. To this end, the material needs to be re-heated in a heat treatment furnace before being quenched.

The reason for the above step is that if quenching is performed at a heating temperature exceeding the $A_{cm}$ point (° C.) at the surface layer 5, the carbides will be dissolved in a solid state in the material, in which case the effects of the steps according to the present invention cannot be obtained. Thus, the heating temperature as low as possible is desirable. On the other hand, if the heating temperature is too low, in the core region of the machine component 1, the core will not be completely austenitized, with soft ferrite partially remaining, leading to reduced fatigue strength. It is therefore desirable to perform quenching at a temperature higher than the $A_{r3}$ point (° C.) of the core.

Further properties of the machine component obtained by the producing method including the above steps will now be described in detail.

(A) That the machine component 1 can be obtained in which the surface layer 3 is made up of a martensitic structure 7 with spheroidized carbides 5 dispersed therein and a residual austenitic structure 7, and the spheroidized carbides 5 having an aspect ratio of 1.5 or less constitute 90% or more of all the carbides.

The aspect ratio defining the ratio of major axis to minor axis of the spheroidized carbide 5 is an index of spheroidization. A carbide with a large aspect ratio, such as one having a plate-like shape or nearly columnar shape, becomes a source of stress concentration during deformation due to its shape, and further becomes an origin of cracking, thereby degrading toughness. Thus, a carbide close to a spherical shape is desirable from the standpoint of improved toughness. When the aspect ratio of the spheroidized carbide 5 is 1.5 or less, the potential harm of becoming an origin of cracking can be reduced.

Thus, a larger proportion of the spheroidized carbides 5 with the aspect ratio of 1.5 or less is more preferable. The producing method of the present invention makes it possible to allow the spheroidized carbides 5 with the aspect ratio of 1.5 or less to constitute 90% or more, and further desirably 95-100%, of the total number of carbides.

(B) That as to the carbides on the prior austenite grain boundaries 6, the proportion of the number of spheroidized carbides on the prior austenite grain boundaries 6 to the total number of carbides can be set to be 40% or less.

The component composition of the steel material of the solution of the present invention falls within the range of hypereutectoid steel in terms of the carbon concentration in the surface region of the machine component obtained by carburization. In a hypereutectoid steel, the mode of brittle fracture degrading the shock resistance characteristics is primarily intergranular fracture along the prior austenite grain boundary 5. This is caused by carbides on the prior austenite grain boundaries 6, i.e. particularly, reticular carbides along the grain boundaries. Carbides that precipitate and exist on the grain boundaries are more likely to become an origin of fracture and more harmful as compared to carbides in the grains. Therefore, it is not preferable that such carbides exist on the grain boundaries. The producing method of the present invention thus enables setting the proportion of the number of spheroidized carbides on the prior austenite grain boundaries to all the carbides to be 40% or less, desirably 20% or less, and even further desirably 5% or less to 0%.

(C) That 90% or more of the spheroidized carbides 5 on the prior austenite grain boundaries 6 are allowed to have a particle size of 1 μm or less.

It is not preferable that carbides exist on prior austenite grain boundaries. In particular, reticular carbides or similarly coarse carbides along the grain boundaries have increased risks of becoming an origin of intergranular fracture. The present invention enables 90% or more, and further desirably 95-100%, of the spheroidized carbides 5 to have a particle size of 1 μm or less, which is low in harmfulness.

Figure 5:
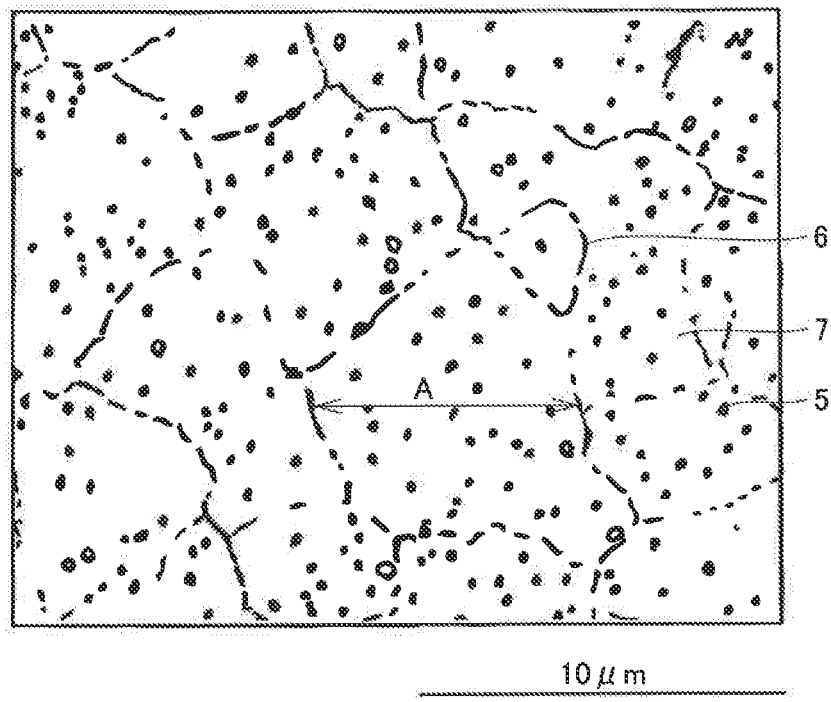
FIG. 5 is a diagram illustrating a structure of a surface layer of an exemplary machine component produced by the present invention.

It should be noted that % used herein is the proportion when the total number of carbides observable by a scanning electronic microscope of a magnification about 5000 is set to be 100%. Very fine carbides that cannot be observed with that magnification power are not taken into account, as they will hardly affect the toughness. In FIG. 5, spheroidized carbides on the prior austenite grain boundaries, which are small in size, are not seen and not shown in the figure.

(D) That the prior austenite grain boundaries 6 provide a grain size of 15 μm or less.

Reducing the grain size A, corresponding to the length across the prior austenite grain boundary 6, can decrease the fracture facet size of intergranular fracture or cleavage fracture, and increase the energy required for the fracture, leading to improved toughness. Reducing the grain size is thus a very effective way of improving the toughness without degrading the hardness.

In the producing method according the present invention, final quenching is performed in the state where the fine carbides have been precipitated, and the quenching is performed at a relatively low temperature, so that the grain size A provided by the prior austenite grain boundaries 6 can be kept fine.

It should be noted that if the grain size A provided by the prior austenite grain boundaries 6 exceeds 15 μm, the effect of improving toughness will become small. Particularly, setting the heating temperature during carburization to 1050° C. or higher will lead to sparse prior austenite grain boundaries 6 even when the final quenching is performed. It is thus useful that the prior austenite grain boundaries 6 can provide the grain size A of 15 μm or less.

The embodiment for carrying out the invention will now be described using examples. It should be noted that % used for the component composition is mass %.

Steels having the component compositions shown in Table 1, with the balance consisting of Fe and unavoidable impurities, were produced in a 100-kg vacuum melting furnace. The obtained steels were drawn out at 1250° C. to obtain bar steels of 32 mm in diameter, which were then normalized at 925° C. for an hour.

Of the test samples, the test samples Nos. 1 to 6 have the component compositions falling within the scope of the present invention. The test samples Nos. 7 to 9 have the component compositions falling outside the scope of the present invention. The underlined values are those falling outside the scope of the present invention. "–" means not added or of an impurity level.

Figure 6:
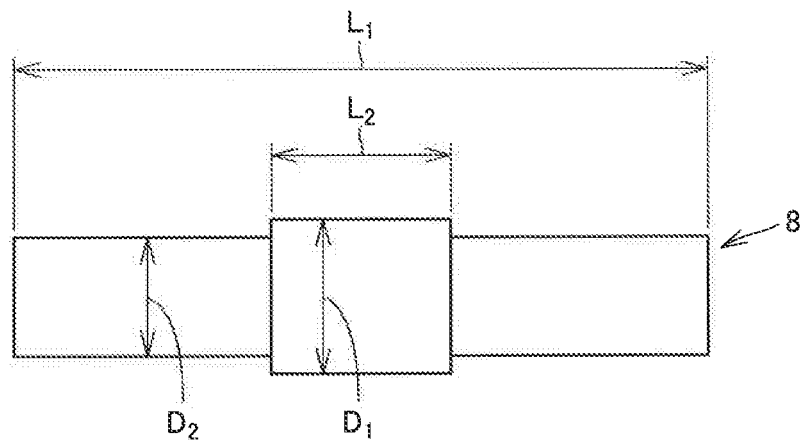
FIG. 6 is a diagram illustrating a shape of a roller pitting test specimen.

Each test sample was roughly shaped (roughly machined) into a roller pitting test specimen (small roller) (1) shown in FIG. 6. During this rough machining, finishing work was performed on the part (2) to be tested, and an excess thickness of 0.2 mm was applied to a grip section (3) alone in preparation for grinding finishing after the subsequent heat treatment. Each test sample was also roughly shaped into a 10R C-notched Charpy impact test specimen (1). During this rough machining, an excess thickness of 2 mm was applied to portions other than the notch surface, in preparation for working to eliminate the carburized layer after the subsequent heat treatment.

TABLE 1

| | | | | | | | | | | | | | | (unit: mass %) | |
| --- | --- | --- | --- | --- | --- | --- | --- | --- | --- | --- | --- | --- | --- | --- | --- |
| | No. | C | Si | Mn | P | S | Cr | Ni | Mo | V | Nb | Al | N | Ti | B |
| Test Samples | 1 | 0.13 | 0.80 | 0.35 | 0.015 | 0.016 | 1.61 | — | — | — | — | 0.024 | 0.016 | — | — |
| | 2 | 0.18 | 0.24 | 0.85 | 0.011 | 0.004 | 0.90 | — | — | — | — | 0.030 | 0.018 | — | — |
| | 3 | 0.23 | 0.54 | 0.26 | 0.014 | 0.009 | 1.82 | — | — | — | 0.04 | 0.028 | 0.018 | — | — |
| | 4 | 0.25 | 0.31 | 0.80 | 0.014 | 0.013 | 1.19 | 0.40 | 0.15 | — | — | 0.030 | 0.015 | — | — |
| | 5 | 0.20 | 0.15 | 0.40 | 0.007 | 0.013 | 1.00 | — | — | — | — | 0.028 | 0.015 | 0.05 | 0.005 |
| | 6 | 0.28 | 0.26 | 0.25 | 0.022 | 0.019 | 2.00 | — | — | 0.20 | 0.10 | 0.035 | 0.014 | — | — |
| | 7 | 0.12 | 0.55 | 0.55 | 0.015 | 0.011 | 2.10 | — | — | — | — | 0.027 | 0.017 | — | — |
| | 8 | 0.20 | 0.33 | 0.85 | 0.018 | 0.008 | 0.85 | — | — | — | — | 0.033 | 0.018 | — | — |
| | 9 | 0.32 | 0.41 | 0.33 | 0.007 | 0.012 | 1.88 | — | — | — | — | 0.028 | 0.016 | — | — |

Next, the test samples of the respective Nos. shown in Table 1 were subjected to gas carburizing under the heating condition shown in Table 2, to attain the carbon concentration in the surface of the test specimen as shown in Table 2. Thereafter, the test samples were cooled to 200° C. or lower at the cooling rate shown in Table 2. Next, the test samples were subjected to spheroidizing annealing while being held at the re-heating temperature shown in Table 2. Further, the test samples were held at the re-heating temperature shown in Table 2, and then quenched. Thereafter, the test samples were tempered, in which they were held at 180° C. for 1.5 hours and then air cooled. The obtained samples were then finished as a roller pitting test specimen (small roller) (1) and a Charpy impact test specimen. In Table 2, the underlined values are those falling outside the scope of the present invention. The "re-heating temperature" corresponds to the spheroidizing annealing temperature and the final quenching temperature.

Of each of the numerical values of the inventive steel component Nos. and the comparative steel component Nos., the value on the tens place means that the steel component has a component composition corresponding to that of the test sample of that No. in Table 1.

(For example, the inventive steel components No. 11 and No. 12 in Table 2 have 1 as the value on the tens place, indicating that they have the component composition of the test sample No. 1 in Table 1 and have been treated with the heat treatment conditions as listed. The inventive steel components No. 21 and No. 22 in Table 2 have 2 as the value on the tens place, indicating that they have the component composition of the test sample No. 2 in Table 1 and have been treated with the heat treatment conditions as listed.)

As to the value on the ones place of each of the numerical values of the inventive steel component Nos. and the comparative steel component Nos. in Table 2, the value 1 or 2 on the ones place means that the listed heat treatment conditions fall within the scope of the present invention, whereas the value 3 or 4 on the ones place means that the listed heat treatment conditions fall outside the scope of the present invention.

(For example, as to the comparative steel component No. 71 in Table 2, the value on the tens place is 7, meaning that it has the component composition as in the test sample No. 7 in Table 1 falling outside the scope of component composition of the present invention, and the value on the ones place is 1, meaning that it has been treated under the heat treatment conditions falling within the scope of the present invention. As to the comparative steel component No. 23 in Table 2, the value 2 on the tens place means that it has the component composition of the test sample No. 2, and the value 3 on the ones place means that it has been treated under the heat treatment conditions falling outside the scope of the present invention.)

TABLE 2

| | No. | Heating Temperature (° C.) | Carbon Concentration in Carburized Surface Layer (° C.) | Cooling Rate after Carburization (° C./s) | Re-Heating Temperature (° C.) |
|---|---|---|---|---|---|
| Inventive Steel Components | 11 | 1030 | 0.8 | 0.3 | 850 |
| | 12 | 930 | 1.1 | 0.6 | 840 |
| | 21 | 940 | 0.9 | 0.4 | 840 |
| | 22 | 850 | 1.0 | 0.7 | 850 |
| | 31 | 950 | 0.9 | 0.2 | 870 |
| | 32 | 940 | 1.0 | 3.4 | 860 |
| | 41 | 950 | 0.9 | 0.3 | 850 |
| | 42 | 1030 | 1.4 | 0.4 | 830 |
| | 51 | 960 | 1.0 | 5.0 | 860 |
| | 52 | 920 | 1.1 | 0.3 | 830 |
| | 61 | 940 | 1.5 | 0.7 | 850 |
| | 62 | 880 | 1.0 | 1.7 | 860 |
| Comparative Steel Components | 71 | 1020 | 0.9 | 0.3 | 840 |
| | 81 | 940 | 0.8 | 0.5 | 850 |
| | 91 | 880 | 0.9 | 0.4 | 880 |
| | 13 | 1040 | 0.8 | 0.3 | 830 |
| | 14 | 950 | 1.0 | 5.3 | 840 |
| | 23 | 880 | 0.9 | 0.5 | 920 |
| | 24 | 920 | 1.6 | 0.3 | 850 |
| | 33 | 980 | 0.7 | 3.0 | 800 |
| | 34 | 940 | 1.0 | 0.2 | 740 |
| | 43 | 840 | 0.9 | 0.4 | 830 |
| | 44 | 930 | 1.1 | 5.2 | 850 |
| | 53 | 830 | 1.0 | 0.6 | 900 |
| | 54 | 920 | 1.7 | 0.4 | 840 |
| | 63 | 1050 | 1.1 | 0.4 | 860 |
| | 64 | 900 | 0.8 | 0.5 | 800 |

Figure 7:
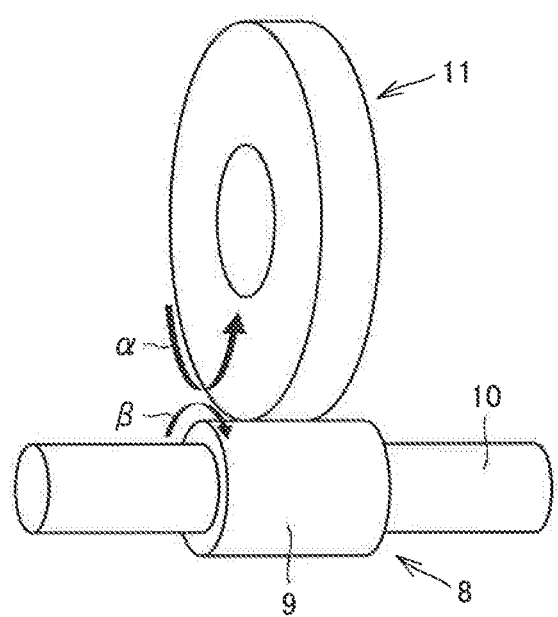
FIG. 7 is a conceptual diagram of a roller pitting test.

Next, the roller pitting test specimen (small roller) (1) shown in FIG. 6, which was produced as explained above, and a large roller test specimen (4) shown in FIG. 7, to be brought into contact with the small roller via oil film in the state where lubricity is applied, were used to perform the roller pitting test shown in FIG. 7 under the conditions listed in Table 3. In the listed conditions, the slip ratio being −40% means that the circumferential velocity of the large roller is slower by 40% than the circumferential velocity of the small roller. Lubricant: ATF (Automatic Transmission Fluid) means lubricating oil that is used for automatic transmissions of vehicles. The large roller crowning amount being 150R means that the peripheral surface of the large roller to be in contact with the small roller has an arc shape with the radius of 150 mm in the rotational axis direction.

TABLE 3

| | |
|---|---|
| Slip Ratio | −40% |
| Surface Pressure | 3.3 GPa |
| Number of Revolutions of Small Roller | 2000 rpm |
| Large Roller Test Specimen (Counterpart) | SCM420 Carburized and Polished Member |
| Large Roller Crowning Amount | 150R |
| Lubricant | ATF |
| Oil Temperature | 80° C. |

The roller pitting test was conducted to detect, using a vibrometer, excessive vibration due to peeling or excessive deformation, and to stop the test upon detection of such vibration. The number of cycles until stoppage of the test was regarded as a life of the test specimen. Further, the Charpy impact test was conducted at a room temperature for evaluation of toughness.

For investigation of the grain size, the roller pitting test specimen (small roller) (1) that had undergone up to the tempering described above was cut into a test piece, and the test piece was embedded in resin so as to enable observation of the cross section from the surface layer to the inside. The region to be inspected was subjected to mirror polishing and intergranular corrosion. Then, an optical microscope was used to image an average view field in the range from the outermost surface to 0.3 mm beneath the surface, to obtain an average grain size (diameter).

For observation of carbides, the test piece was embedded in resin, as in the case described above. The region to be inspected was mirror-polished and then corroded with nital. A scanning electronic microscope was used to image an average view field in the range from the outermost surface to 0.3 mm beneath the surface, to obtain an image of microstructure, as shown in FIG. 5, in which carbides were shown identified. For the identified carbides, image analysis was conducted to confirm: the proportion of carbides with the aspect ratio of 1.5 or less in the carbides (%), the proportion of the number of carbides on the prior austenite grain boundaries (%), the proportion of carbides with a particle size exceeding 1 μm on the prior austenite grain boundaries (%), and an average grain size provided by the prior austenite grain boundaries (μm).

It should be noted that, for the test specimens that have undergone, following the tempering, surface treatment of one or more of cutting, grinding, polishing, shot blasting, shot peening, hard shot peening, and fine particle shot peening, observations similar to those described above were performed by regarding the treated surface as the surface layer.

The test results are shown in Table 4. The Charpy impact value and pitting resistance are shown with respect to those of the comparative steel component No. 81. The comparative steel component No. 81 has a component composition of the test sample No. 8 in Table 1, which is a steel corresponding to JIS SCr420. That is to say, the Charpy impact value of the steel of each No. in Table 4 is indicated as a ratio relative to the Charpy impact value of the comparative steel component No. 81 produced using the steel corresponding to SCr420. Then, the steel component was determined to be good in toughness when it had the Charpy impact value ratio of 1.5 or more relative to the comparative steel component No. 81.

The pitting resistance of the steel component of each No. in Table 4 is indicated as a ratio in Table 4 when the number of cycles until the occurrence of pitting in the comparative steel component No. 81 is set to be 1. At this time, it was determined that the pitting resistance was good when the ratio of the number of cycles until the occurrence of pitting was 2.0 or more.

That is to say, while a carbide with a large aspect ratio would become a source of stress concentration during deformation due to its shape and would become an origin of cracking and degrade toughness, the proportion of such carbides is small, so the toughness is improved instead of being degraded.

Further, for the inventive steel components Nos. 11 to 62, the proportion of the number of spheroidized carbides 5 on the prior austenite grain boundaries to the total number of carbides was 11-40%, or, 40% or less. In the test samples Nos. 1 to 7 (steels within the scope of component composition of the present invention), the spheroidized carbides 5 on the prior austenite grain boundaries having the particle size exceeding 1 μm accounted for 3-7%. That is to say, 90% or more of the spheroidized carbides 5 on the prior austenite grain boundaries had a particle size of 1 μm or less. While carbides that precipitate and exist on the prior austenite grain boundaries (particularly, reticular carbides along the grain boundaries) are more likely to become an origin of fracture and more harmful as compared to carbides in the grains, in the present invention, the carbides on the grain boundaries

TABLE 4

| | No. | Proportion of carbides with aspect ratio of 1.5 or less (%) | Proportion of number of carbides on prior austenite grain boundaries (%) | Proportion of carbides with particle size exceeding 1 μm on prior austenite grain boundaries (%) | Prior austenite grain size (μm) | Charpy impact value | Pitting resistance |
|---|---|---|---|---|---|---|---|
| Inventive | 11 | 95 | 25 | 5 | 8 | 2.5 | 2.5 |
| Steel | 12 | 96 | 28 | 6 | 6 | 2.2 | 2.2 |
| Components | 21 | 94 | 34 | 4 | 5 | 2.2 | 2.7 |
| | 22 | 95 | 22 | 3 | 7 | 2.0 | 2.8 |
| | 31 | 97 | 15 | 4 | 5 | 2.0 | 2.6 |
| | 32 | 92 | 38 | 5 | 7 | 1.6 | 2.5 |
| | 41 | 93 | 20 | 10 | 6 | 2.1 | 2.9 |
| | 42 | 96 | 32 | 7 | 9 | 1.6 | 2.3 |
| | 51 | 91 | 36 | 5 | 4 | 1.8 | 2.5 |
| | 52 | 94 | 21 | 4 | 5 | 2.0 | 2.7 |
| | 61 | 90 | 11 | 3 | 4 | 1.7 | 2.6 |
| | 62 | 93 | 30 | 7 | 6 | 1.9 | 2.3 |
| Comparative | 71 | 83 | 14 | 14 | 10 | 0.8 | 1.4 |
| Steel | 81 | 88 | 25 | 9 | 7 | 1.0 | 1.0 |
| Components | 91 | 95 | 45 | 15 | 4 | 0.7 | 0.8 |
| | 13 | 85 | 17 | 18 | 12 | 0.7 | 1.3 |
| | 14 | 91 | 30 | 11 | 14 | 0.8 | 1.2 |
| | 23 | 93 | 33 | 14 | 13 | 0.9 | 0.9 |
| | 24 | 83 | 43 | 13 | 5 | 0.7 | 1.0 |
| | 33 | 87 | 22 | 9 | 6 | 0.8 | 1.0 |
| | 34 | 92 | 18 | 13 | 7 | 0.9 | 1.1 |
| | 43 | 93 | 48 | 17 | 7 | 0.8 | 0.7 |
| | 44 | 90 | 28 | 18 | 6 | 0.9 | 0.8 |
| | 53 | 88 | 42 | 12 | 5 | 0.7 | 1.1 |
| | 54 | 81 | 47 | 15 | 7 | 0.8 | 0.7 |
| | 63 | 83 | 44 | 8 | 6 | 0.9 | 0.5 |
| | 64 | 91 | 43 | 16 | 7 | 0.7 | 0.9 |

As shown in Tables 1 and 2, the test samples Nos. 1 to 7 of the component compositions in Table 1 (steels within the scope of component composition of the present invention) were subjected to carburization in which the samples were heated at a temperature in the range of 850-1030° C. indicated in Table 2 to achieve the carbon concentration in the surface layer of 0.8-1.5%. Thereafter, the samples were cooled to 200° C. at 0.2-5.0° C./s, and then subjected to spheroidizing annealing in which they were re-heated to and held at 810-860° C. The samples were then tempered at 150° C., and consequently, the inventive steel components Nos. 11 to 62 were obtained.

At this time, as shown in Table 4, firstly, the carbides with the aspect ratio of 1.5 or less accounted for 90-98%, or, 90% or more, in the inventive steel components Nos. 11 to 62.

have been reduced to 40% or less, and 90% or more of those carbides had the size of 1 μm or less, which is low in harmfulness.

Further, in the inventive steel components Nos. 11 to 62, the prior austenite grain boundaries provided a grain size of 4-8 μm. Reducing the prior austenite grain size can decrease the fracture facet size of intergranular fracture or cleavage fracture, and increase the energy required for the fracture, thereby improving the toughness. Therefore, the steel component for machine structural use, using the inventive steel, has improved toughness.

In the inventive steel components Nos. 11 to 62, the Charpy impact ratio relative to 1.0 of the comparative steel component No. 81 was 1.6 to 2.5, or, 1.5 or more, indicating high toughness.

Similarly, in the inventive steel components Nos. 11 to 62, the ratio of the number of cycles until occurrence of pitting, relative to 1.0 of the comparative steel component No. 81, was 2.2 to 2.9, indicating good pitting resistance.

As seen from the above, the machine components produced by the producing method of the present invention all exhibit excellent pitting resistance characteristics and excellent toughness.

It should be understood that the embodiment and examples disclosed herein are illustrative and non-restrictive in every respect. The scope of the present invention is defined by the terms of the claims, rather than the description above, and is intended to include any modifications within the scope and meaning equivalent to the terms of the claims.

DESCRIPTION OF REFERENCE NUMERALS

1: gear (machine component); 2: carburized layer; 3: surface layer; 4: core; 5: spheroidized cementite (spheroidized carbide); 6: prior austenite grain boundary; 7: martensitic structure or residual austenitic structure; 8: roller pitting test specimen (small roller); 9: part to be tested; 10: grip section; 11: large roller test specimen; and A: grain size.

The invention claimed is:

1. A method for producing a machine component, comprising the steps of:
   preparing a material formed of a steel material containing 0.13-0.30% C and 0.90-2.00% Cr in mass % and further containing at least one of Si, Mn, Ni, Mo, Nb, V, Ti, B, Al, and N, with the balance consisting of Fe and unavoidable impurities; carburizing the material at a heating temperature of 850-1050° C. to attain a carbon concentration of 0.8-1.5% in a surface layer of the material;
   cooling the material at an average rate of 5° C./sec or lower in a temperature range from a temperature higher than the $A_{cm}$ point (° C.) at the surface layer to a cooling end temperature that is at least 50° C. lower than the $A_1$ point (° C.), to cause the surface layer to have a pearlite structure or a bainite structure;
   performing spheroidizing annealing at a heating temperature not higher than the $A_{cm}$ point (° C.) at the surface layer of the material, to spheroidize carbides in the pearlite structure or the bainite structure; and
   after heating the material to a temperature not higher than the $A_{cm}$ point (° C.) at the surface layer of the material, performing quenching and then tempering.

2. A method for producing a machine component using a steel material having a component composition containing 0.13-0.30% C and 0.90-2.00% Cr in mass % and further containing at least one of Si, Mn, Ni, Mo, Nb, V, Ti, B, Al, and N, with the balance consisting of Fe and unavoidable impurities, the machine component being carburized to attain a carbon concentration in a surface of 0.8-1.5%, a surface layer that includes an outermost surface having a structure made up of a martensitic structure with spheroidized carbides dispersed therein and a residual austenitic structure, the spheroidized carbides with an aspect ratio of 1.5 or less constituting 90% or more of all carbides, as to carbides on prior austenite grain boundaries, the proportion of the number of the spheroidized carbides on the prior austenite grain boundaries to a total number of the carbides being 40% or less, the method comprising the steps of:
   preparing a material formed of the steel material having the component composition;
   carburizing the material at a heating temperature of 850-1050° C. to attain the carbon concentration of 0.8-1.5% in the surface of the material, to form the surface layer on the surface of the material;
   cooling the material at an average rate of 5° C./sec or lower in a temperature range from a temperature higher than the $A_{cm}$ point (° C.) at the surface layer to a cooling end temperature that is at least 50° C. lower than the $A_1$ point (° C.), to cause the surface layer to have a pearlite structure or a bainite structure;
   performing spheroidizing annealing at a heating temperature not higher than the $A_{cm}$ point (° C.) at the surface layer of the material, to spheroidize carbides in the pearlite structure or the bainite structure; and
   after heating the material to a temperature not higher than the $A_{cm}$ point (° C.) at the surface layer of the material, performing quenching to form the martensitic structure, and then performing tempering.

3. The machine component producing method according to claim 2, wherein 90% or more of the spheroidized carbides on the prior austenite grain boundaries have a particle size of 1 μm or less.

4. The machine component producing method according to claim 3, wherein the prior austenite grain boundaries provide a grain size of 15 μm or less.

* * * * *